(12) United States Patent
Langley et al.

(10) Patent No.: US 8,743,371 B2
(45) Date of Patent: Jun. 3, 2014

(54) OPTICAL WAVEGUIDE SPLITTERS

(75) Inventors: Lloyd Langley, Northampton (GB);
Robert Griffin, Towcester (GB); Ian Brian Betty, Ottawa (CA)

(73) Assignee: Oclaro Technology Limited, Northamptonshire (GB)

(*) Notice: Subject to any disclaimer, the term of this patent is extended or adjusted under 35 U.S.C. 154(b) by 297 days.

(21) Appl. No.: 13/254,809

(22) PCT Filed: Mar. 3, 2010

(86) PCT No.: PCT/GB2010/050370
§ 371 (c)(1),
(2), (4) Date: Nov. 28, 2011

(87) PCT Pub. No.: WO2010/100489
PCT Pub. Date: Sep. 10, 2010

(65) Prior Publication Data
US 2012/0062900 A1    Mar. 15, 2012

(30) Foreign Application Priority Data

Mar. 3, 2009 (GB) ................................. 0903605.4
Sep. 30, 2009 (GB) ................................. 0917137.2

(51) Int. Cl.
*G01B 9/02* (2006.01)
*G02B 6/32* (2006.01)

(52) U.S. Cl.
USPC ........................................... 356/477; 385/31

(58) Field of Classification Search
USPC ............. 356/477; 250/227.28; 398/188, 200, 398/214, 198, 201; 385/4, 8, 20, 21, 39, 40, 385/41, 42, 45, 50
See application file for complete search history.

(56) References Cited

U.S. PATENT DOCUMENTS

| | | | |
|---|---|---|---|
| 6,571,038 B1 | 5/2003 | Joyner et al. | |
| 7,035,494 B1 * | 4/2006 | Mackie | ............................ 385/15 |
| 7,116,460 B2 | 10/2006 | Griffin | |
| 7,327,911 B2 * | 2/2008 | Piede et al. | ...................... 385/14 |
| 2009/0220185 A1 * | 9/2009 | Wada et al. | ....................... 385/3 |

FOREIGN PATENT DOCUMENTS

| | | |
|---|---|---|
| GB | 2 438 222 A | 11/2007 |
| JP | 2001-183710 A | 7/2001 |
| WO | WO 03/016957 A2 | 2/2003 |
| WO | WO 03/016988 A1 | 2/2003 |

OTHER PUBLICATIONS

Jonathan Klamkin, Monolithically Integrated Balanced Uni-Traveling-Carrier Photodiode with Tunable MMI Coupler for Microwave Photonic Circuits, 2006 IEEE.*

(Continued)

*Primary Examiner* — Gregory J Toatley
*Assistant Examiner* — Maurice Smith
(74) *Attorney, Agent, or Firm* — Fenwick & West LLP (57) ABSTRACT

A Mach-Zehnder interferometer (MZI) incorporates a tunable multimode interference (MMI) coupler comprising a tunable MMI coupler with a tuning electrode on a surface of a tunable MMI region and an electrically insulating region provided within the tunable MMI region. The MMI region is tunable in response to detection of a photocurrent by a photodetector section. Such a tunable MZI is particularly advantageous in enabling a split ratio of an optical splitter, the split ratio and the splitter to be controlled in a particularly efficient manner.

10 Claims, 6 Drawing Sheets

(56) References Cited

OTHER PUBLICATIONS

P. A. Besse, New Ix2 Multi-Mode Interference Couplers with Free Selection of Power Splitting Ratios 1994 Istituto Internazionale delle Comunicazioni.*
Klamkin et al., "Monolithically Integrated Balanced Uni-Traveling-Carrier Photodiode with Tunable MMI Coupler for Microwave Photonic Circuits," *Optoelectronic and Microelectronic Materials and Devices*, 2006 Conference, IEEE, PI, pp. 184-187 (Dec. 1, 2006).
Griffin et al., "40Gb/s RZ GaAs Transmitter with Integrated Waveform Monitoring," European Conference on Optical Communication, Copenhagen, Denmark, vol. 4, pp. 1-2 (Sep. 8, 2002).
PCT/GB2010/050370 International Search Report (Aug. 16, 2010).
Besse, P.A., et al., "New 1×2 Multi-Mode Interference Couplers with Free Selection of Power Spitting Ratios," in $20^{th}$ European Conference on Optical Communication (ECOC '94), Firenze, Italy, Sep. 25-29, 1994, pp. 669-672.
Leuthold, J., et al., "Multimode Interference Couplers with Tunable Power Splitting Ratios," Journal of Lightwave Technology, vol. 19, No. 5, pp. 700-707, May 2001.
Patent Cooperation Treaty, Written Opinion of the International Searching Authority, International Patent Application No. PCT/GB2010/050370, Mailed Aug. 16, 2010, 9 Pages.
Yagi, M., et al., "Versatile multimode interference photonic switches with partial index-modulation regions," Electronic Letters, vol. 36, No. 6, pp. 533-534, Mar. 16, 2000.

* cited by examiner

OPTICAL WAVEGUIDE SPLITTERS

FIELD OF THE INVENTION

The present invention concerns optical waveguide splitters comprising multimode interference couplers and in particular monolithically integrated optical circuits comprising such optical waveguide splitters and control schemes for optical waveguide splitters.

BACKGROUND OF THE INVENTION

In the field of optical telecommunications components, monolithically integrated optical circuits are widely used. Such optical circuits commonly comprise a plurality of optical waveguides (e.g. ridge waveguides) connected by means of optical splitters, at which light is split or recombined to or from different branch waveguides. Examples of such optical circuits are Mach-Zehnder interferometer (MZI) devices, such as Mach-Zehnder modulators (MZMs). MZMs are used to modulate an optical signal with an electrical data signal by splitting the optical signal into two components, phase modulating one component relative to the other, and recombining the components. With appropriate choice of the phase modulation, constructive and destructive optical interference between the components will take place on recombination, resulting in an amplitude modulated combined signal. An example of a monolithically integrated optical circuit in which two MZMs are monolithically integrated by means of an optical splitter is illustrated in the optical differential quaternary phase shift key (ODQPSK) encoder disclosed in U.S. Pat. No. 7,116,460. Further examples of MZI devices include Mach-Zehnder switches and Mach-Zehnder pulse carvers.

Multimode interference (MMI) couplers are commonly used as the optical splitters and recombiners in MZMs. In such devices light from a substantially single mode waveguide passes through a port into an MMI region comprising a multimode waveguide that describes an optical interference region, and out through one or more ports at the opposite end of the MMI region. Passage of the light into the MMI region excites optical modes of the MMI region, which optically interfere, periodically re-imaging along the length of the MMI region, and forming a terminal re-imaging through the ports at the end correspond with the terminal re-imaging pattern.

In a typical simple MMI design the MMI region is rectangular in plan, and is many times longer than it is wide. The intensity profile of the re-imaging pattern is governed by several factors such as the length and width of the MMI region. The re-imaging pattern can be further governed by a non-rectangular shape of the MMI region, for example having a constricted ("butterfly" type) or enlarged ("barrelled" type) waist half-way along the length of the region, as disclosed in "New 1×2 Multi-Mode Interference Couplers with Free Selection of Power Splitting Ratios" by Besse et al. in a paper to the 1994 European Conference on Optical Communication.

The optical splitting performance of such MMI couplers devices is limited by the fabrication accuracy of the MMI region. Further the optical splitting is susceptible to thermally induced and stress induced performance variations. Accordingly, the fabrication tolerances of the MMI impact significantly upon the manufacturing yield of the optical circuits in which they are integrated. Further, the optical performance of MMIs and integrated optical circuits into which MMIs are incorporated can drift during operational life, due to variations in ambient conditions and the effects of ageing. In an MZM, deterioration in optical performance can reduce the extinction ratio of the amplitude modulated optical output.

As is disclosed in JP2001-183710 by Yazaki et al. and GB2438222 the re-imaging pattern in an MMI region can be controlled by the use of tuning electrodes provided on the surface of the region. The tuning electrodes are positioned to lie over one or more of the main re-imaging nodes of the region, and in cooperation with a back electrode, can be used to modify the refractive index of the underlying waveguide material by means of an electro-optic effect.

Changing the refractive index changes the optical path length of the corresponding part of the multimode waveguide, inducing a phase shift in the light passing beneath the electrode. By inducing such phase changes in the light in the MMI region the subsequent re-imaging patterns are modified, in particular changing the terminal re-imaging pattern and thereby modifying the output power intensities that exit the MMI region through the different ports. In this way the optical split ratio of the transmitted light can be controlled.

Disadvantageously, the current that passes between the electrodes on top of the MMI region and the back electrode spreads, broadening the region in which the refractive index occurs to be wider than the extent of the tuning electrodes. This current spreading reduces the current density closest to the re-imaging node, compensating for which requires an increased total current injection, leading to a corresponding increase in the thermal dissipation of the device. Further, the spreading of the current reduces optical performance of the tunable optical splitter by causing refractive index changes in undesirable parts of the MMI region.

Thus there remains a need for an improved design of tunable optical splitter, which seeks to address at least some of the disadvantages of the prior art designs.

The paper "Versatile multimode interference photonic switches with partial index-modulation regions" by Yagi et al., published in Electronics Letters, Vol. 36, No. 6, pp 533-534, describes mathematical modelling of the tuning performance of tunable optical splitters. Accordingly, the ideal operating conditions can be determined for controlling a tunable optical splitter in accordance with the modelling results to give the desired splitting performance.

Alternatively, the optical performance of a tunable MMI coupler that is used in a tunable optical splitter can be determined by monitoring the light emitted from the output waveguides at the output facet, and the control conditions for the coupler can be set accordingly. However, such a method requires the use of external power monitoring components, which are difficult to align with the output light, increasing complexity and associated expense of this step within an industrial manufacturing process.

Further, the present inventors have appreciated that the performance of a tunable optical splitter will be susceptible to the effects of manufacturing variations in the fabrication of the MMI region and deposition of the electrodes. Further, the performance will vary with ambient temperature, mechanical stress and the effects of ageing over life, such as creep in the electrode metallization. Accordingly a tunable MMI coupler will not necessarily have an optical performance response in accordance with the modelling or remain constant in its response over life.

Thus there remains a need for an apparatus adapted to enable control of an MMI device having a tunable split ratio and a corresponding control scheme, which seeks to address at least some of the disadvantages of the prior art.

Optical splitters having MMIs with fixed split ratios are used as the optical splitters and recombiners in conventional optical waveguide Mach-Zehnder interferometers, such as Mach-Zehnder modulators (MZMs). Different applications require MZIs having different optical properties and it is necessary to choose the correct hardware from a variety of optoelectronic modules with different optical properties, necessitating the manufacture and storage of an inventory of different parts. The optical performance of such MZIs is subject to variations in fabrication, ambient conditions and the effects of ageing. Further, if the requirements of the application should change, it would be necessary to change the hardware in order to provide a module with different optical properties.

In long distance optical telecommunications applications, the refractive index of optical fibres commonly varies as a function of the wavelength of light transmitted. High data rate optical signals have a substantial bandwidth, causing optical signals transmitted along long optical fibres to suffer from deterioration of the signal quality due to chromatic dispersion. Although some telecommunications applications require the use of zero chirp, in other telecommunications applications it also is common to mitigate such deterioration in the signal quality by applying chirp to the optical output.

In MZMs, the extinction ratio and chirp performance of the MZM are a function of the optical split ratios of the MMI regions used in the optical splitters and recombiners of the MZM. Imbalanced (i.e. unequal) split ratios are used to provide non-zero chirp in the optical output of the MZM.

Thus there remains a need for an MZI having a controllable split ratio of the optical splitter or optical recombiner, and for an MZM having a controllable chirp, in which the level of chirp is controlled by means of controlling the split ratio of the optical splitter and/or recombiner.

U.S. Pat. No. 6,571,038 and the paper, "Multimode Interference Couplers with Tunable Power Splitting Ratios" by Joyner et al published in Journal of Lightwave Technology, Vol. 19, No. 5, pp-700-707, 2001, describe a multimode interference coupler having a tunable power splitting ratio and a method of tuning the splitting ratio. The tuning of the power splitting ratio is achieved by varying an effective refractive index around a portion in a multimode interference section.

SUMMARY OF THE INVENTION

It is an object of the present invention to provide a tunable MMI device and may be a control scheme that seek to overcome at least some of the disadvantages of the prior art.

According to one aspect of the invention, there is provided a controllable optical splitter comprising a tunable multimode interference (MMI) coupler, the tunable MMI coupler comprising a tunable MMI region, an input waveguide and an output waveguide having a photodetector section and a corresponding photodetector electrode, wherein a tuning electrode provided on a surface of the tunable MMI region is tunable in response to detection of a photocurrent by the photodetector section.

According to another aspect of the invention there is a method of controlling a controllable optical splitter comprising a tunable multimode interference (MMI) coupler, the tunable MMI coupler comprising a tunable MMI region, an input waveguide and an output waveguide having a photodetector section and a corresponding photodetector electrode and a tuning electrode being provided on a surface of the tunable MMI region, the method comprising tuning the MMI region in response to detection of a photocurrent by the photodetector section.

According to another aspect of the invention there is provided a tunable multimode interference (MMI) coupler comprising a tunable MMI region, input and output waveguides, and a tuning electrode, the tunable MMI region having a surface and the tuning electrode being provided on the surface, wherein an electrically insulating region is provided within the tunable MMI region.

The electrically insulating region may be adjacent to the tuning electrode. The electrically insulating region may extend substantially throughout the tunable MMI region except beneath the tuning electrode. Alternatively, the tunable MMI region may have an electrically insulating region and a non-electrically insulating region.

The electrically insulating region may be formed by ion implantation. The electrically insulating region may be self-aligned with respect to the tuning electrode.

The tunable MMI coupler may have two output waveguides. The tunable MMI region may be configured to have an imbalanced split ratio in the untuned state. The split ratio in the untuned state may be imbalanced in the range of 0.625:1 to 1.6:1.

The tunable MMI coupler may have two output waveguides and a photodetector section and a corresponding photodetector electrode may be provided within each output waveguide.

The photodetector section may be an arm photodetector section, and an arm photodetector section may be provided within an interferometer arm. The arm photodetector section may be provided within each interferometer arm adjacent the optical recombiner. The arm photodetector section may be adapted to function as an optical control section. Alternatively, the photodetector section may be a dedicated photodetector section. The photodetector section may be an output photodetector section, and an output photodetector section may be provided within an interferometer output waveguide. The photodetector section may be provided within each interferometer output waveguide adjacent the optical recombiner.

The tuning current may comprise a dither signal.

The interferometer may be provided with an arm photodetector section within each interferometer arm adjacent the optical recombiner, the interferometer having first and second interferometer output waveguides with an output photodetector section being provided within each interferometer output waveguide adjacent the optical recombiner, the optical recombiner being the controllable optical splitter, the method further comprising measuring an effective split ratio ($SR_e$) of the intensities of the light within the arm photodetector sections, measuring an output ratio ($R_{out}$) of intensities of light within the output photodetector sections, controlling the tuning current to the tuning electrode in correspondence with the effective split ratio ($SR_e$).

The method may comprise controlling the tuning current to the tuning electrode such that the output ratio ($R_{out}$) of intensities of light within the output photodetector sections and the effective split ratio ($SR_e$) of the intensities of the light within the arm photodetector sections are in the relationship $R_{out} = (SR_{e+1}/SR_e)/2$.

BRIEF DESCRIPTION OF THE DRAWINGS

For a better understanding of the present invention and to show more clearly how it may be carried into effect, reference will now be made, by way of example only, to the accompanying drawings, in which.

DETAILED DESCRIPTION OF PREFERRED EMBODIMENTS

Figure 1:
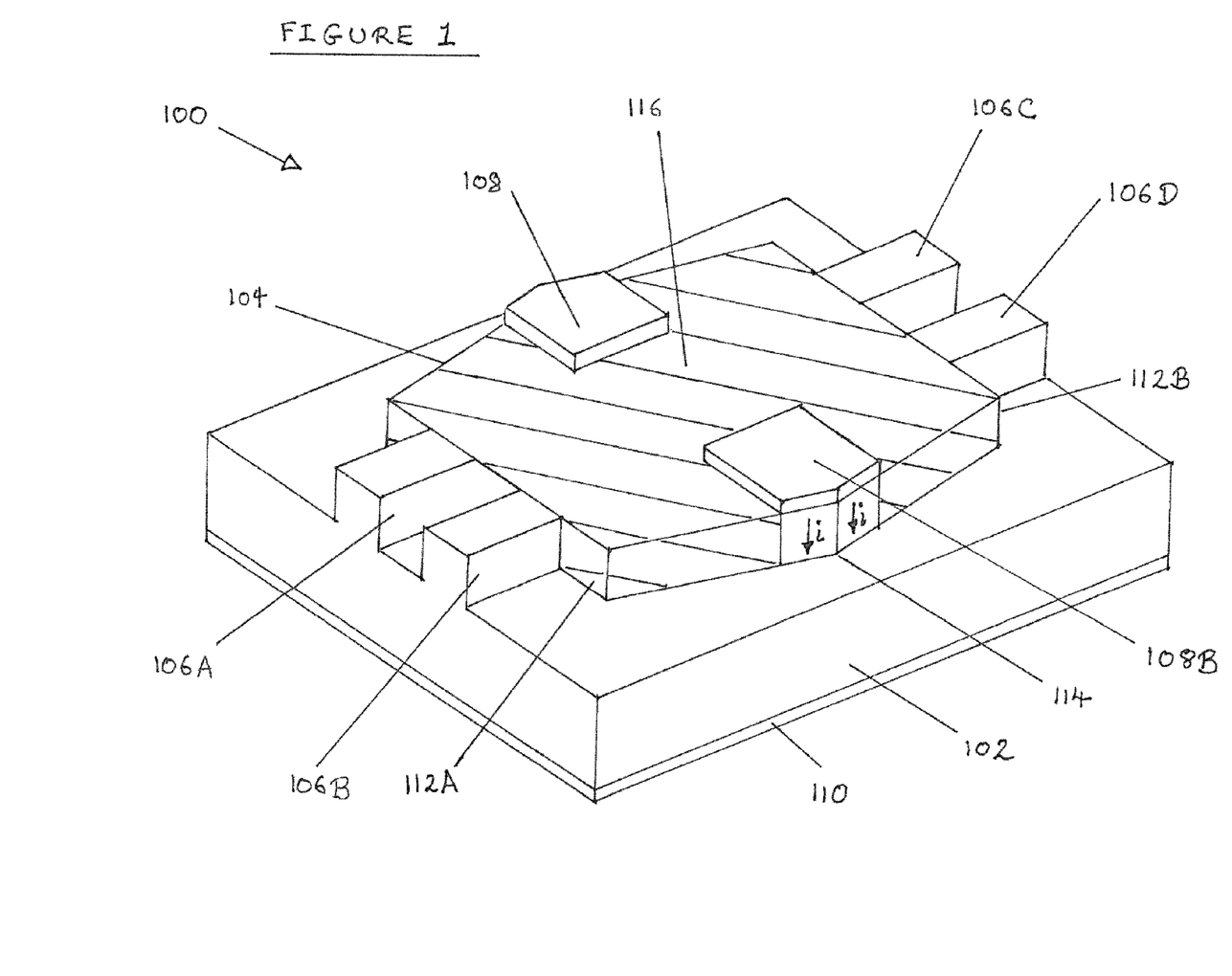
FIG. 1 is a schematic illustration of an implanted tunable MMI coupler.

FIG. 1 schematically illustrates a tunable multimode interference (MMI) coupler 100 according to the present invention. The tunable MMI coupler 100 is formed as part of a ridge waveguide structure formed on the front surface of a substrate 102. The tunable MMI coupler 100 has an MMI region 104, waveguides 106A to 106D and tuning electrodes 108.

The waveguides 106A to 106D are substantially monomode and optically couple with the MMI region 104.

The tuning electrodes 108 are provided on the surface of the MMI region 102. On the opposite side of the substrate 102 from the tuning electrodes 108, the back surface is provided with a back electrode 110.

The MMI region 104 is barrel-shaped, having sides that taper outward from each end 112A and 112B to a waist 114 halfway along the length of the region. The MMI region 104 has an electrically insulating region 116 abutting the region of the MMI region 104 covered by the tuning electrodes 108.

In use, substantially monomode light enters the tunable MMI coupler 100 through a waveguide 106A to 106D. Optical modes of the MMI region 104 are excited and the light forms re-imaging patterns along the length of the region. The tuning electrodes 108 are located above key optical re-imaging nodes of the MMI region.

The split ratio is the ratio of the intensity of light transmitted through one output waveguide with the intensity of light transmitted through the other output waveguide. The split ratio can be tuned by means of inducing refractive index change in the MMI region beneath the tuning electrodes.

Refractive index change can be induced beneath a tuning electrode 108 by tuning the tuning electrode with respect to the back electrode 110. The biasing may be either by forward biasing causing the carrier-induced index change effect or by reverse biasing causing the electric field induced electro-optic effect. For a given bias, the carrier-induced effect is typically larger and less wavelength dependant than the electric field induced effect.

In the case of a tunable MMI coupler having an operating range of split ratios centred on the balanced split ratio condition (i.e. equal split), the MMI region (e.g. a 1×2 or 2×2 MMI region) can be fabricated with a substantially balanced split ratio in the untuned state and use both forward and reverse biasing of the tuning electrodes to exploit both the carrier induced index change effect and the, to tune the optical split ratio away from the balanced split condition. Alternatively an MMI may be fabricated with a split ratio that is imbalanced (i.e. offset from an equal split ratio), in the untuned state, such a single biasing polarity (e.g. the carrier-induced index change effect) may be used to tune across a range of split ratios on both sides of the balanced condition. Similar considerations apply where it is required that the operating range of split ratios is imbalanced.

The operating range of split ratios of a tunable MMI coupler is a function of both the split ratio of the MMI region in the untuned state and the level of refractive index change that can be induced within the MMI region by the tuning current. For example, an MMI region with a split ratio of 1.6:1 in the untuned state may be tuned under forward bias to a split ratio of 0.4:1.

Higher port count MMIs (generally NXM MMIs, for example a 4×4 MMI) may also be fabricated with surface electrodes and electrically insulating regions. The electrodes may be arranged to tune the balance of some or all of the powers at the output ports of the MMIs.

Current spreading in the case of forward biasing of the tuning electrodes is reduced by rendering regions of the MMI region electrically insulating. The electrically insulating region 116 may be formed by methods known in the art, such as by ion implantation, in which the desired region is implanted with high energy ions, such as ions of hydrogen or helium that render the targeted region electrically insulating. A mask is used to screen the ion implantation, such that only the desired region is rendered insulating. A separate screening mask may be used, such as a mask of silica (SiO). Alternatively, the ion implantation can be at least partially screened by the metallization of the tuning electrodes 108, thus self-aligning the electrically insulating region with the electrodes. Other methods by which the electrically insulating region may be formed include quantum well intermixing or etch and re-growth.

The effect of the electrically insulating region surrounding the tuning electrodes is that when a current is driven between the tuning electrodes 108 and the back electrode 110, it is substantially prevented from spreading, leading to the current through the optically active part of the MMI region flowing substantially perpendicularly to the tuning electrodes. Advantageously, by preventing spreading of the current that flows between the tuning electrodes and the back electrode, the current density beneath the tuning electrodes is kept at a high level, maximising the change in refractive index beneath the tuning electrodes, where the key optical re-imaging nodes occur. Further, by preventing the current from spreading to regions that have been rendered electrically insulating, unwanted changes in the refractive index in the regions surrounding the tuning electrodes is prevented, avoiding associated degradation of the optical performance of the tunable MMI coupler.

To optimise the performance of the tunable MMI coupler, it may be desirable for there to be a border between the tuning electrodes and the electrically insulating region. Alternatively the electrically insulating region may undercut the edge of the tuning electrodes.

In the case that the electrically insulating region is created by a self-aligned process, the region may undercut the tuning electrodes. For example, in the case that the electrically insulating region is created by ion implantation, scattering of the ions during implantation may lead to spreading of the ions, thereby causing undercutting of the edges of the tuning electrodes.

In FIG. 1 the electrically insulating region 116 covers the entirety of the tunable MMI coupler 100, except for the region directly beneath the tuning electrodes 108. However, ion implantation may induce optical loss in light transmitted through the implanted regions of an optical device. Accordingly, in the alternative design of tunable optical coupler 100', illustrated in FIG. 2, the electrically insulating region 116' may be restricted such that it extends over only part of the length of the tunable MMI coupler 100', adjacent to the tuning electrodes. Accordingly the tuning electrodes 108 are substantially electrically isolated from the non-electrically insulating regions 118' of the MMI region 104' by the electrically insulating region 116'.

It will be appreciated that although described with respect to a tunable MMI 100 having a barrel-shaped MMI region 102, the present invention applies equally well to tunable MMI couplers having differently shaped MMI regions, such as those having straight-sided walls or a butterfly shape with walls that taper inwards from each end to a waist half-way along the length of the region.

Figure 2:
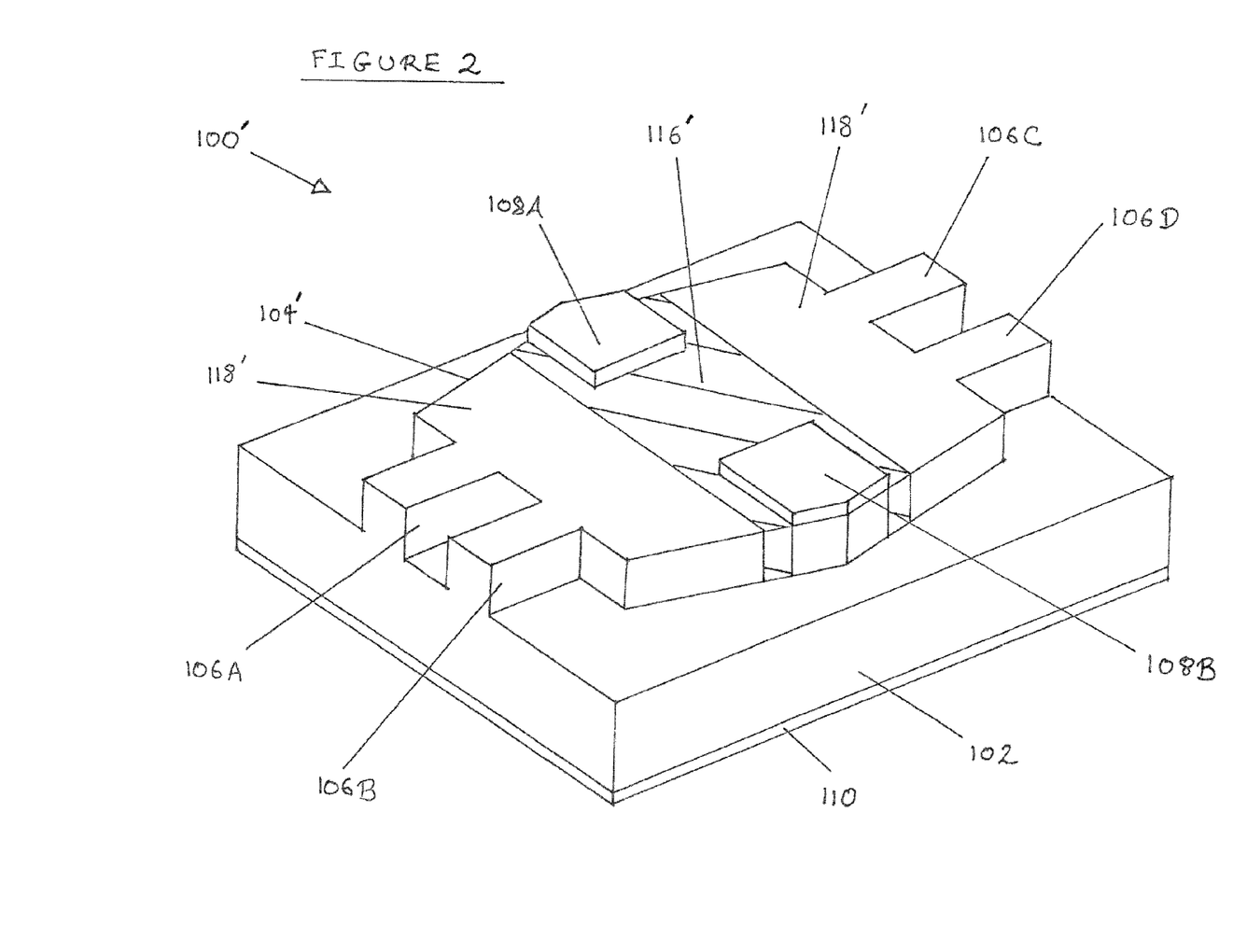
FIG. 2 is a further schematic illustration of an implanted tunable MMI coupler.

One skilled in the art will appreciate that FIGS. 1 and 2 are not to scale, and that typically an MMI region is many times longer than it is wide. For example the length of an MMI region may be at least five times greater than the width. Exemplary sizes of tunable MMI coupler are between 4 and 14 um wide and between 50 and 250 um long.

Figure 3:
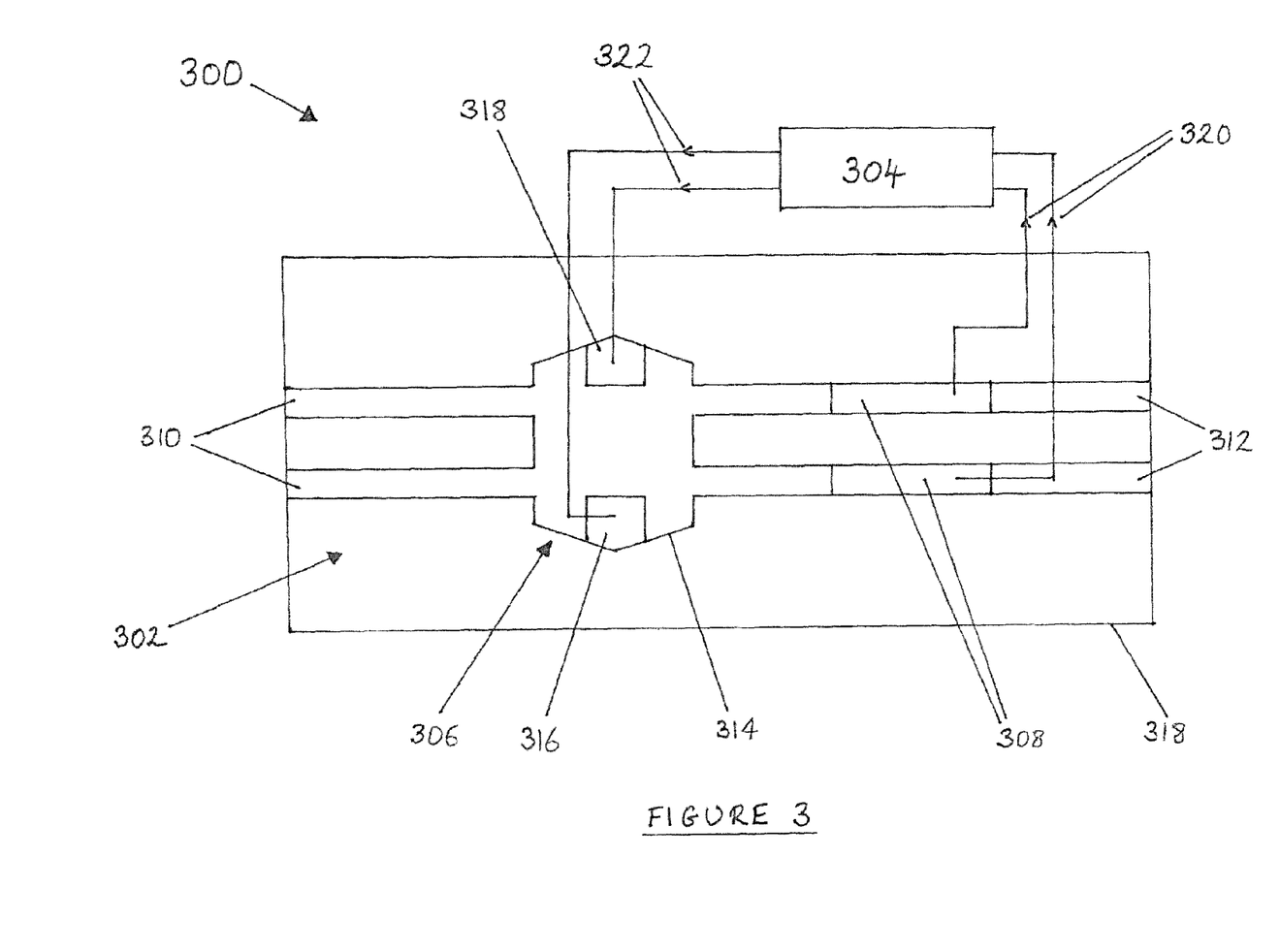
FIG. 3 is a schematic illustration in plan view of a controllable optical splitter having an electrical control system.

FIG. 3 illustrates a controllable optical splitter 300, which has a monolithically integrated optical circuit 302 and an electrical control system 304. The optical circuit 302 comprises a tunable MMI coupler 306 and photodetector sections 308. The tunable MMI coupler 306 comprises input waveguides 310 and output waveguides (i.e. monitor waveguides) 312, a tunable MMI region 314 and tuning electrodes 316. In the case of FIG. 3 the tunable MMI coupler 306 has two output waveguides 312.

The waveguides 310 and 312 are optically coupled to a tunable MMI region 314, and the tuning electrodes 316 are provided on a surface of the MMI region. The tunable MMI coupler 306 has an MMI region 314 and tuning electrodes 316. The photodetector sections 308 are located within the output waveguides 312 and are provided with respective photodetector electrodes (not shown). The electrical control system 304 is electrically connected to the tuning electrodes 316 and the photodetector electrodes. The substrate 318 has a back electrode (not shown) provided on the opposite side of the substrate from the controllable optical splitter 300.

The input and output waveguides 310 and 312 are substantially monomode. Light passing into the MMI region 314 from one or more of the input waveguides 310 excites optical modes of the MMI region, which re-image at the ports of the output waveguides 312, through which the light exits the MMI region. The tuning electrodes 316 are located on the MMI region 314 above key re-imaging nodes of the MMI region.

The intensity of light passing along each of the output waveguides 312 is determined by the optical split ratio of the tunable MMI coupler 306. The photodetector sections 308 sample the light passing along the output waveguides 312, and the electrical control system 304 receives photocurrents 320 from corresponding photodetector sections. The photocurrents 320 are in correspondence with the intensities of light passing along each of the output waveguides 308. Accordingly, the photocurrents 320 are in correspondence with the optical split ratio of the tunable MMI coupler 306.

The electrical control system 304 drives tuning currents 322 through the MMI region 314 beneath the tuning electrodes 316, where they flow through the MMI region and cause localised changes in the refractive index of the MMI region. Consequently, light passing through the tuning currents 322 beneath the tuning electrodes 316 undergoes a phase change, determining the optical split ratio of the light between the output waveguides 312. Accordingly the electrical control system 304 controls the optical split ratio of the tunable MMI coupler 306 by setting the tuning currents 322 in correspondence with the photocurrents 320 from the photodetector electrodes.

The back electrode is connected to the electrical control system 304 and functions in cooperation with the tuning electrodes 316 and the photodetector electrodes. The back electrode is a common electrode and may be electrically grounded.

The MMI region 314 adjacent to the tuning electrodes 316 may be rendered electrically insulating, for example by the implantation of high-energy ions, such as hydrogen or helium. The electrically insulating region may cover all or part of the MMI region 314 surrounding the tuning electrodes 316.

The MMI region 314 illustrated in FIG. 3 is a 2×2 MMI region, having two ports at each end. However, the present invention is applicable to any MMI region having a plurality of ports at one or both of the input and output ends, such that it may be used as an optical splitter or recombiner. By way of a further example, the present invention is also applicable to a 1×3 MMI.

Figure 4:
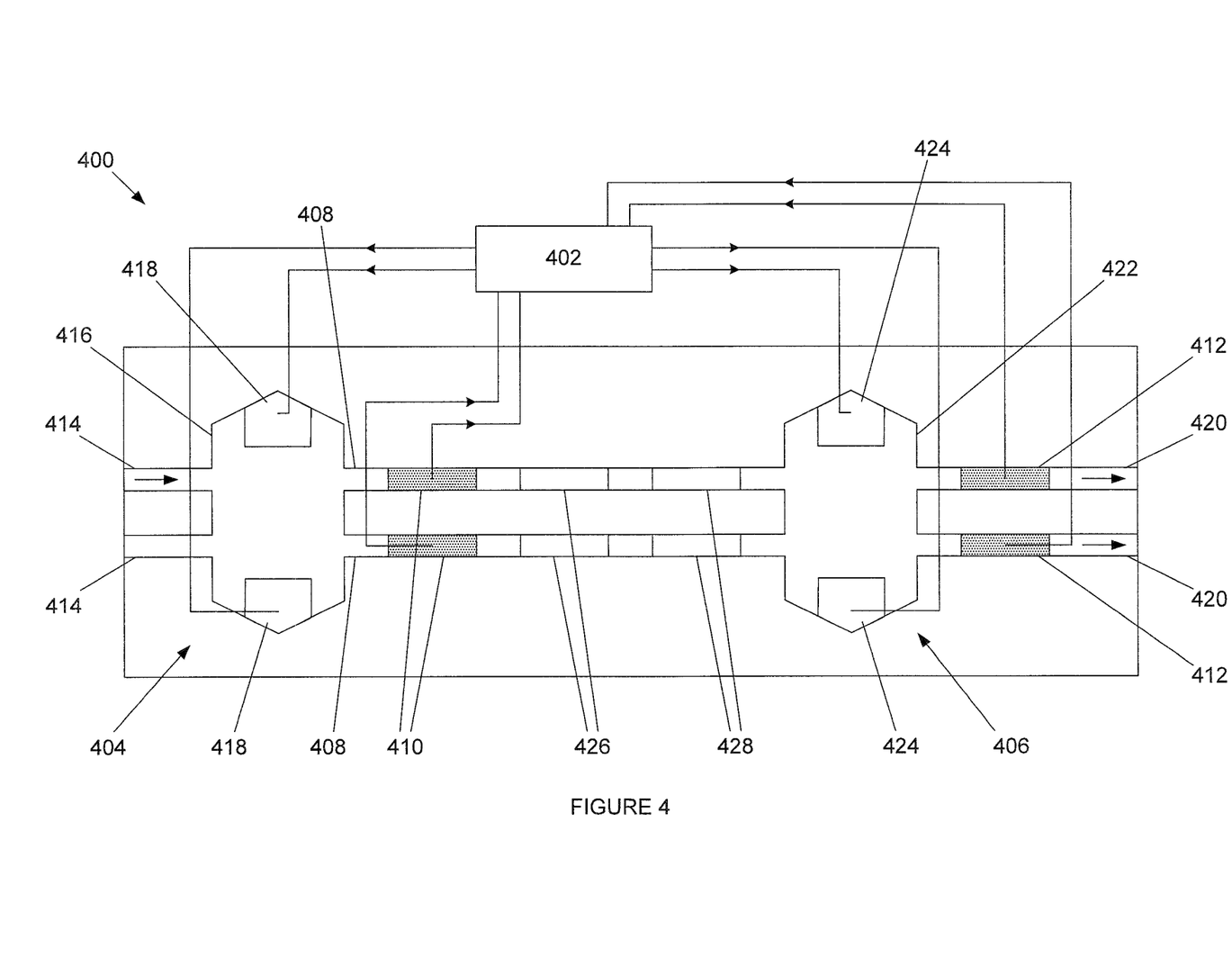
FIG. 4 is a schematic illustration in plan view of a Mach-Zehnder modulator having an electrical control system.

FIG. 4 illustrates a Mach-Zehnder modulator (MZM) 400 that has a monolithically integrated optical circuit and an electrical control system 402. The optical circuit comprises a first tunable MMI coupler 404, a second MMI coupler 406, modulator arms 408, first photodetector sections 410 and second photodetector sections 412. The first tunable MMI coupler 404 comprises first input waveguides 414, first output waveguides being the modulator arms 408, a first tunable MMI region 416 and first tuning electrodes 418. The second tunable MMI coupler 406 comprises second input waveguides being the modulator arms 408, second output waveguides 420, a second tunable MMI region 422 and second tuning electrodes 424. The MZM input waveguides are provided by the first input waveguides 414, and the MZM output waveguides provided by the second output waveguides 420.

Both the first and second MMI regions 416 and 422 are 2×2 MMIs. The first photodetector sections 410 are located in the waveguide arms 408. The second photodetector sections 412 are located in the output waveguides 420. The photodetector sections have corresponding photodetector electrodes (not shown). RF modulation sections 426 and DC phase control sections 428 are also provided in the waveguide arms 408 and have corresponding electrodes (not shown). The MZM 400 has a back electrode (not shown).

Light passing into the first MMI region 416 from a first input waveguide 414 is split by the first tunable MMI coupler 404 between the modulator arms 408, where the intensities are sampled by the first photodetector sections 410. The light passing along the modulator arms 408 is modulated with RF electrical data in the RF modulation sections 426. The light from the modulator arms 408 is recombined in the second tunable MMI coupler 406 and split between the second output waveguides 420, where the intensities are sampled by the second photodetector sections 412. The light passing along one of the second output waveguides 420 is the RF modulated optical output of the MZM 400, and the light in the other second output waveguide 420 is its optical complement, which is typically not output from the MZM. The electrical control system 402 monitors the light intensity passing through the photodetector sections 410 and 412 and controls the drive currents to the tuning electrodes 418 and 424 in correspondence with those light intensities. For clarity, aspects of the electrical control scheme 402 concerned with RF modulation, phase control or the back electrode have not been illustrated in FIG. 4.

In the untuned state the first and/or second MMI couplers of an MZI may have balanced optical split ratios (1:1). Conversely in the untuned state, the first and/or second MMI couplers of an MZI may have imbalanced optical split ratios. In the untuned state the split ratio of one or both of the tunable MMI couplers may be imbalanced in the range 0.625:1 to 1.6:1. Further, the split ratio in the untuned state may be in the range 0.4:0.6 to 0.6:0.4. Yet further, the split ratio in the untuned state may be in the range 0.45:0.55 to 0.55:0.45.

In operation the first and/or second MMI couplers of an MZI may have balanced optical split ratios (1:1), for example to produce zero chirp of an RF modulated optical output or to maximise the extinction ratio of the MZI. Conversely in operation, the first and/or second MMI couplers of an MZI may have imbalanced optical split ratios, for example to produce non-zero chirp of an RF modulated optical output. In operation the split ratio of one or both of the tunable MMI couplers may be imbalanced in the range 0.625:1 to 1.6:1. Further, the split ratio in operation may be in the range 0.4:0.6 to 0.6:0.4. Yet further, the split ratio in operation may be in the range 0.45:0.55 to 0.55:0.45.

An MZI having tunable MMIs may be used to compensate for fabrication tolerances, the effects of ambient conditions and ageing of the MZI in order to maintain the device at the desired optical performance over lifetime. Advantageously, by the use of an MZM with tunable MMIs that can be monitored and controlled, the optical chirp of an MZM can be optimised and updated over life.

An MZM can be fabricated with one or both MMI couplers having substantially equal split ratios in the untuned state that use both forward and reverse biasing of the tuning electrodes to exploit both the carrier-induced index change effect and the electric field induced electro-optic effect in order to tune across a range of positive and negative chirps. Alternatively an MZM may be fabricated with one or both MMI couplers having an imbalanced split ratio in the untuned state, such that one of the carrier-induced electro-optic index change effect and the electric field induced electro-optic effect may be used to tune the MZM across a range of positive, zero and negative chirp values.

In the embodiment illustrated in FIG. 4, both the MMI regions 416 and 422 are tunable and dedicated first and second photodetector sections 410 and 412 are provided on modulator arms 408 and the second output waveguides 420. In an alternative embodiment, instead of dedicated photodetector sections 410 and 412, the function of detecting the intensities of the light in the modulator arms 408 may additionally be performed by another optical control section within the waveguide arms, such as the RF modulation sections 426 or the DC phase control sections 428. Further, one of the first and second MMI regions 416 or 422 may be tunable and the other MMI region may be fixed. In a yet further embodiment, photodetector sections may be present only on the modulator arms or only on the second output waveguides 420.

A frequency modulation signal having a small amplitude (commonly known as a "dither" signal) may be applied to the drive currents to one or both of the tunable MMI couplers. In the case that photodetector sections are only present on the second output waveguides and both MMIs are tunable, the use of such dither signals can facilitate independent monitoring and control of the one or more tunable MMIs.

The monolithically integrated optical circuits discussed herein may be incorporated into more complex optical circuits. For example, a pair of MZMs described herein may be monolithically integrated in parallel, in an optical differential quaternary phase shift keying (ODQPSK) modulator. In a further example, a pair of such ODQPSK modulators may in turn be monolithically integrated in parallel to form a yet more complex optical differential phase shift key modulator, for example in a modulator that outputs two ODQPSK signals that may be filtered to be polarized for transmission along a common polarization maintaining optical fibre.

It will be appreciated that the above description with reference to FIG. 4 can also be applicable to higher port count MMIs (for example a 4×4 MMI). The only difference in this case would be that eight photodetectors are required and the electrical control system is adjusted accordingly with the photodetectors.

Figure 5:
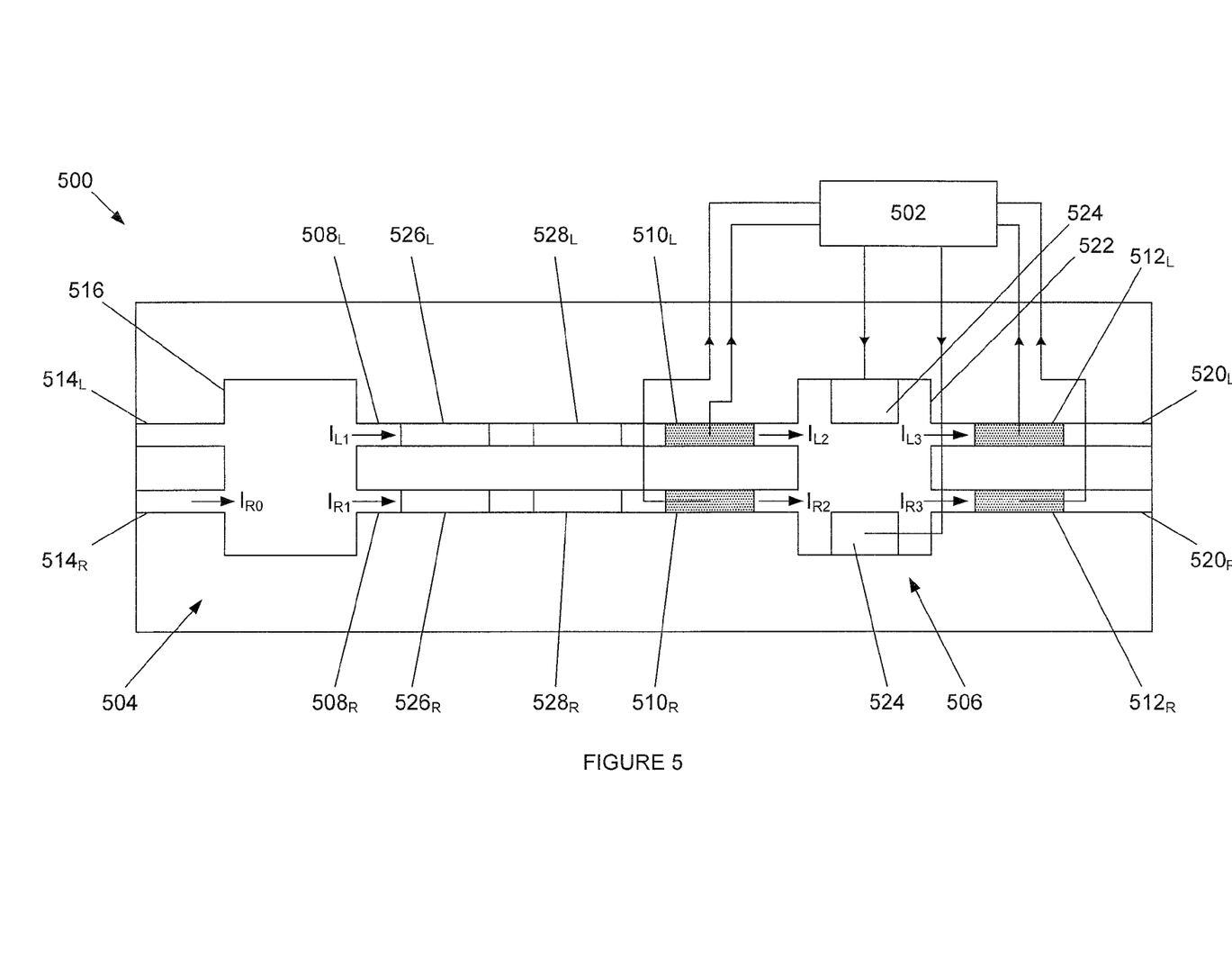
FIG. 5 is a schematic illustration in plan view of a further Mach-Zehnder modulator having an electrical control system.

FIG. 5 illustrates a further MZM 500 that has a monolithically integrated optical circuit and an electrical control scheme 502, and which is configured to produce a zero chirp optical output. The optical circuit comprises a first MMI coupler 504, a second MMI coupler 506, two modulator arms $508_L$ and $508_R$, two first photodetector sections $510_L$ and $510_R$ and two second photodetector sections $512_L$ and $512_R$. The first MMI coupler 504 comprises two first input waveguides $514_L$ and $514_R$, two first output waveguides being the modulator arms $508_L$ and $508_R$, and an MMI region 516. The first MMI coupler 504 has a fixed split ratio and is not provided with tuning electrodes. The second MMI coupler 506 has a tunable split ratio and comprises two second input waveguides being the two modulator arms $508_L$ and $508_R$, two second output waveguides $520_L$ and $520_R$, a tunable MMI region 522 and two tuning electrodes 524. The MZM input waveguides are provided by the first input waveguides $514_L$ and $514_R$, and the MZM output waveguides provided by the second output waveguides $520_L$ and $520_R$.

Both the first and second MMI regions 516 and 522 are 2×2 MMIs. The first photodetector sections $510_L$ and $510_R$ are located in the waveguide arms $508_L$ and $508_R$ adjacent to the input ports of the second MMI 506. The second photodetector sections $512_L$ and $512_R$ are located in the output waveguides $520_L$ and $520_R$ adjacent to the second MMI 506. The photodetector sections have corresponding photodetector electrodes (not shown). RF modulation sections $526_L$ and $526_R$ and DC phase control sections $528_L$ and $528_R$ are also provided in the waveguide arms $508_L$ and $508_R$ and have corresponding electrodes (not shown). The MZM 500 has a back electrode (not shown).

In use, light of intensity $I_{R0}$ propagating along the first input waveguide $514_R$ passing into the first MMI region 516 is split by the first tunable coupler 504 into light of intesities $I_{L1}$ and $I_{R1}$ propagating into respective modulator arms $508_L$ and $508_R$. The light $I_{L1}$ and $I_{R1}$ propagates along the modulator arms $508_L$ and $508_R$, passing through the RF modulation sections $526_L$ and $526_R$ and the DC phase control sections $528_L$ and $528_R$. In propagating along the modulator arms $508_L$ and $508_R$ the light is attenuated, and typically the attenuation in each of the modulator arms is different. The intensities of the light in the modulator arms $508_L$ and $508_R$ is sampled by the first photodetector sections $510_L$ and $510_R$, in order to measure the intensities of the light $I_{L2}$ and $I_{R2}$ propagating into the second MMI coupler 506. The light from the modulator arms $508_L$ and $508_R$ is recombined in the second MMI coupler 506 and split between the second output waveguides $520_L$ and $520_R$, and the light intensities $I_{L3}$ and $I_{R3}$ of light entering the second MMI coupler are sampled by the second photodetector sections $512_L$ and $512_R$. The light $I_{R3}$ passing into one of the second output waveguides $520_R$ is used as the RF modulated optical output of the MZM 500, and the light $I_{L3}$ passing into the other second output waveguide $520_L$ is its optical complement, which is typically not output from the MZM. The electrical control system 502 monitors the photodetector sections $510_L$, $510_R$, $512_L$ and $512_R$ and controls the drive currents to the tuning electrodes 524. For clarity, aspects of the electrical control scheme 502 concerned with RF modulation, phase control or the back electrode have not been illustrated in FIG. 5.

In use, light passing through the MZM 500 may be modulated with a high bit rate data steam. The photodetectors 510$_L$ and 510$_R$, 512$_L$ and 512$_R$ may be responsive to high bit rate data streams, and the signals detected from the photodetectors may be time averaged. Alternatively the photodetectors may not be responsive at the rate of a high bit rate data stream and the signals detected from the photodetectors may be time averaged.

The split ratio of the first MMI coupler 504 is unbalanced, such that the light I$_{R0}$ propagating into the first MMI coupler is split in accordance with the first split ratio, SR$_1$, such that light of intensities I$_{L1}$ and I$_{R1}$ is incident into the modulator arms, where SR$_1$=I$_{L1}$/I$_{R1}$ (e.g. SR$_1$>1). Due to differential attenuation of the light incurred during propagation along the modulator arms 508$_L$ and 508$_R$, the intensity ratio of the light I$_{L2}$ and I$_{R2}$ incident into the second MMI coupler 506 will typically be different from that (SR$_1$) of the light incident into the modulator arms. Accordingly, the light I$_{L2}$ and I$_{R2}$ incident upon the input ports of the second MMI coupler 506 has an effective split ratio, SR$_e$=I$_{L2}$/I$_{R2}$, which is typically different from the split ratio SR$_1$ of the first MMI coupler 504. The first photodetector sections 510$_L$ and 510$_R$ enable the control system 502 to measure the effective split ratio, SR$_e$, by measuring the intensities of light passing through the first photodetector sections. The tunable split ratio of the second MMI coupler 506 is tuned in correspondence with the measured effective split ratio.

When the MZM 500 is used to produce a zero chirp output I$_{R3}$, the tunable split ratio of the second MMI coupler 506 is tuned such that the output ratio R$_{out}$ of intensities of the light I$_{R3}$ and I$_{L3}$ incident into the outputs waveguides 520$_L$ and 520$_R$ of the second MMI coupler is as described in the relationship R$_{out}$=(SR$_e$+1/SR$_e$)/2. The intensities of the light I$_{R3}$ and I$_{L3}$ output from the second MMI coupler is measured by the second photodetectors 512$_L$ and 512$_R$.

The split ratio of the second MMI coupler 506 is designed to be significantly less in its untuned state than in its tuned state, which enables the tunable split ratio to be tuned across a range of split ratios including the intended operating condition, by means of a single electro-optic effect, e.g. the carrier induced index change effect. The provision of such a tuning range permits control of the device by the electrical control scheme 502 in order to overcome differences in optical properties caused by fabrication tolerances, the effects of ambient conditions and ageing of the MZM in order to maintain the device at the desired optical performance over lifetime.

It will be appreciated by the skilled person that in FIG. 5 either or both of the MMI couplers may be tunable. Advantageously a pair of photodetectors are disposed adjacent both the input and the outputs of the second MMI coupler, enabling the tunable MMI or MMIs, to be tuned to compensate for the differential loss of light propagating along the modulator arms, fabrication tolerances, the effects of ambient conditions and the effects of ageing.

It will also be appreciated by the skilled person that the design features discussed above with respect to FIG. 5 are also applicable to MZMs operable to generate a non-zero chirp output.

Alternatively, an electrical control system is not necessary if the split ratio (of tunable MMIs) and the relative loses of the waveguide arms can be kept sufficiently stable. The most stringent implication of such a technique is that the split ratio adjustment mechanism of the tunable MMI does not change or age in efficiency over the life of the MMI. Such a technique may be termed a "set and forget" technique. In this technique, the split ratios of the MZs are set during manufacture, and then the tuning technique of the tunable MMI is adjusted to result in a required split ratio, which can be measured by photodetectors placed on the MZ arms or output waveguides.

It is worth mention that the key feature of the tuning technique using the electrical control system is that the tunable MMI split ratio is offset from 1.0 (with a compensating opposite split ratio on the tunable MMI) in the untuned state. This is because it gives a MZ output detector photocurrent ratio (time averaged during data transmission) which varies as the tunable MMI is adjusted. However, in the "set and forget" technique, the tunable MMI can have any split ratio in the untuned state.

Figure 6:
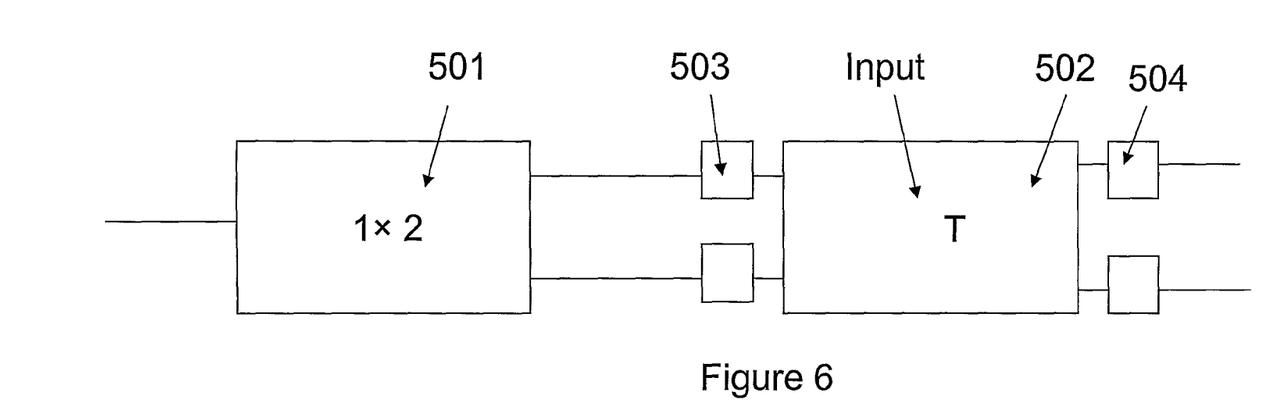
FIG. 6 is a schematic illustration in plan view of a further 1×2 Mach-Zehnder modulator which does not have an electrical control system.

FIG. 6 illustrates a 1×2 MZM which does not have an electrical control system but which incorporates a 1×2 splitter MMI 501, a recombiner 502 and output waveguide detectors 504. The recombiner 502 is set to a tuning value during manufacture so that a desired output waveguide detector (504) photocurrent ratio can be achieved.

Figure 7:
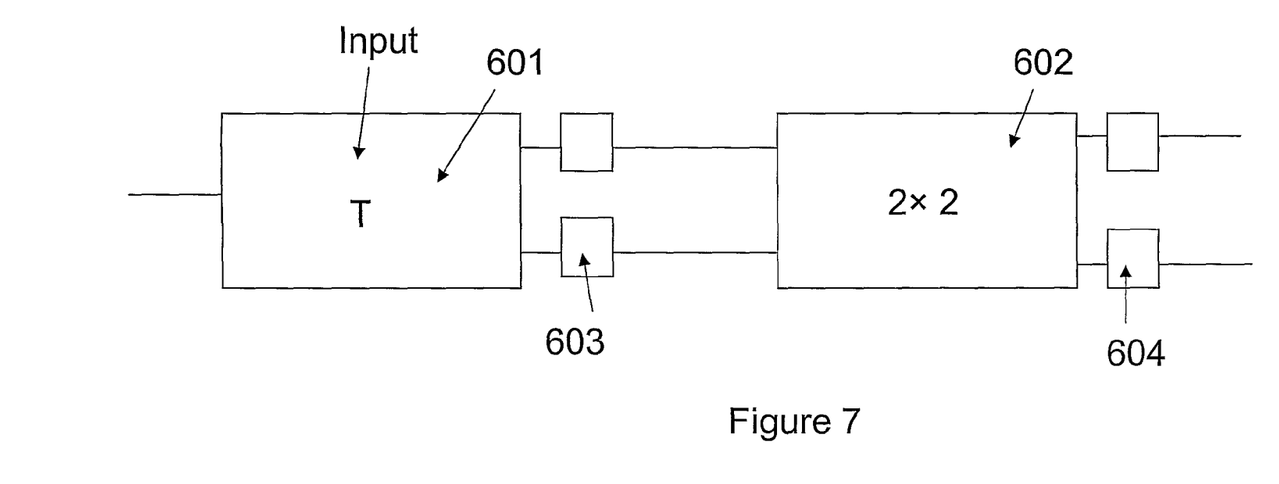
FIG. 7 is a schematic illustration in plan view of a further 2×2 Mach-Zehnder modulator which does not have an electrical control system.

FIG. 7 illustrates a variant of the MZM (2×2 MZM) shown in FIG. 4 in which the electrical control system is omitted and a tunable MMI 2×2 input splitter 601, a recombiner MMI 602, output waveguide detector 604 are provided. In this embodiment, the tunable MMI 2×2 input splitter 601 is adjusted during manufacture to give a desired MZ split ratio using the ratio of photocurrents from the output waveguide detectors 604. The recombiner MMI 602 can be of any split ratio.

Although the back electrodes of the embodiments described have been described as being on an opposite side of the optical substrate from the respective optical circuits, tuning electrodes and other electrodes located on waveguide sections, the skilled person will appreciate that different arrangements are possible for providing a common electrode, and that all electrodes may be provided on the same side of the substrate.

It will be appreciated by the skilled person that although optical devices have been discussed with respect to input and output ends, light may pass along optical waveguides and through MMI regions in either direction, and the use of these terms and the terms splitter and recombiner is not limiting with respect to the direction of optical transmission.

The invention claimed is:
1. A tunable Mach-Zehnder interferometer comprising:
an optical splitter comprising at least one input waveguide and two output waveguides;
an optical recombiner comprising two input waveguides and two output waveguides;
a pair of interferometer arms, each optically coupled between one of the output waveguides of the optical splitter and one of the input waveguides of the optical recombiner;
an arm photodetector section provided within each interferometer arm, the arm photodetector sections configured to measure the intensities of light passing therethrough so as to measure an effective split ratio (SRe) of the intensities of the light;
an output photodetector section provided within each output waveguide of the optical recombiner, the output photodetector sections configured to measure an output ratio (R$_{out}$) of intensities of light within the output photodetector sections;
wherein each of the optical splitter and recombiner further comprises a tunable multimode interference (MMI) cou- pler, the tunable MMI coupler comprising a tunable MMI region and a tuning electrode on a surface of the tunable MMI region, and wherein a tuning current to the tuning electrode of the MMI coupler of at least one of the splitter and recombiner is controlled in correspondence with the effective split ratio (SRe), and the tuning current to the tuning electrode is controlled such the output ratio ($R_{out}$) and effective split ratio (SRe) are in the relationship Rout=(SRe+1/SRe)/2.

2. The interferometer according to claim 1, further comprising an electrical control system for controlling the tuning current to the tuning electrode in response to detection of a photocurrent by the arm photodetector sections.

3. The interferometer according to claim 2, wherein the effective split ratio is measured by the electrical control system.

4. The interferometer according to claim 1, wherein the tunable MMI region is configured to have an imbalanced split ratio in the untuned state.

5. The interferometer according to claim 4, wherein the split ratio in the untuned state is imbalanced in the range 0.625:1 to 1.6:1.

6. The interferometer according to claim 1, wherein the tuning electrode is manually tunable during set-up to a setting, the tunability being measured by the arm photodetector sections or the output photodetector sections.

7. The interferometer according to claim 6, wherein the tunable MMI region is configured to have any split ratio in the untuned state.

8. The interferometer according to claim 1, wherein the output ratio ($R_{out}$) of intensities of the light within the output photodetector sections is time averaged.

9. The interferometer according to claim 1, wherein the tuning current comprises a dither signal.

10. A method of controlling a tunable Mach-Zehnder interferometer, the interferometer comprising:

an optical splitter comprising at least one input waveguide and two output waveguides;

an optical recombiner comprising two input waveguides and two output waveguides;

a pair of interferometer arms, each optically coupled between one of the output waveguides of the optical splitter and one of the input waveguides of the optical recombiner;

an arm photodetector section provided within each interferometer arm;

an output photodetector section provided within each output waveguide of the optical recombiner;

wherein each of the optical splitter and recombiner further comprises a tunable multimode interference (MMI) coupler, the tunable MMI coupler comprising a tunable MMI region and a tuning electrode on a surface of the tunable MMI region;

the method comprising:

measuring an effective split ratio (SRe) of the intensities of the light within the arm photodetector sections;

measuring an output ratio ($R_{out}$) of intensities of light with the output photodetector sections; and controlling a tuning current to the tuning electrode of the MMI coupler of one of the splitter and recombiner in correspondence with the effective split ratio (SRe), wherein the tuning current to the tuning electrode is controlled such that that the output ratio ($R_{out}$) and effective split ratio (SRe) are in the relationship $R_{out}$=(SRe+1/ SRe)/2.

* * * * *

UNITED STATES PATENT AND TRADEMARK OFFICE
CERTIFICATE OF CORRECTION

PATENT NO. : 8,743,371 B2  
APPLICATION NO. : 13/254809  
DATED : June 3, 2014  
INVENTOR(S) : Lloyd Langley et al.

Page 1 of 1

It is certified that error appears in the above-identified patent and that said Letters Patent is hereby corrected as shown below:

In the claims,

Claim 1, column 13, line 8, after "such," insert --that--

Signed and Sealed this
Fourteenth Day of April, 2015

Michelle K. Lee
*Director of the United States Patent and Trademark Office*